United States Patent [19]

Ito et al.

[11] Patent Number: 4,949,261
[45] Date of Patent: Aug. 14, 1990

[54] STEERING CONTROL SYSTEM FOR WHEELED VEHICLE

[75] Inventors: Ken Ito, Yokohama; Hideo Ito, Zushi, both of Japan

[73] Assignee: Nissan Motor Company, Limited, Yokohama, Japan

[21] Appl. No.: 245,148

[22] Filed: Sep. 16, 1988

[30] Foreign Application Priority Data

Sep. 25, 1987 [JP] Japan .................. 62-239058

[51] Int. Cl.$^5$ .................. B62D 5/04; B62D 7/04
[52] U.S. Cl. .................. 364/424.05; 180/140; 180/142
[58] Field of Search ............ 364/424.05, 424.01; 180/140, 141, 133, 134, 282; 280/91

[56] References Cited

U.S. PATENT DOCUMENTS

| 3,866,706 | 2/1975 | Lincke et al. .......... 180/142 |
| 4,597,462 | 7/1986 | Sano et al. ............ 180/140 |
| 4,705,130 | 11/1987 | Fukunaga et al. ..... 180/140 |
| 4,706,771 | 11/1987 | Kawabe et al. ....... 180/142 |
| 4,718,685 | 1/1988 | Kawabe et al. ....... 180/142 |
| 4,720,790 | 1/1988 | Miki et al. ........... 364/424.05 |
| 4,786,066 | 11/1988 | Kondo et al. .......... 280/91 |
| 4,828,061 | 5/1989 | Kimbrough et al. .... 180/79.1 |
| 4,828,283 | 5/1989 | Ishii et al. ............ 280/91 |

FOREIGN PATENT DOCUMENTS 61-115776 6/1986 Japan .

Primary Examiner—Thomas G. Black
Attorney, Agent, or Firm—Foley & Lardner, Schwartz, Jeffery, Schwaab, Mack, Blumenthal & Evans

[57] ABSTRACT

A system for controlling the steering angle of the rear steerable wheels of a vehicle senses the front wheel steering angle, the vehicle speed and a manually selected mode signal for a new mode of two driving modes. A microcomputer containing models for the two modes determines a target yaw rate for the selected mode from which is calculated a target rear wheel steering angle to control rear wheel steering. However, the system is prevented from calculating a steering angle for the new mode when it would cause an unsafe abrupt change in vehicle behavior as when the rear wheel steering angle is not nearly zero which is equivalent to the sensed front steering angle, the target yaw rate and the lateral acceleration all being nearly zero.

5 Claims, 4 Drawing Sheets

STEERING CONTROL SYSTEM FOR WHEELED VEHICLE

BACKGROUND OF THE INVENTION

1. Field of the Invention

The present invention relates in general to a vehicle having a set of steerable front wheels (for main steering) and a set of steerable rear wheels (for secondary steering) and more specifically to a steering control system for controlling the steering angles of the front and rear wheels based on the vehicle running conditions in order to improve the vehicle running characteristics such as the straight-ahead running characteristic, the turning characteristic, etc.

2Description of the Prior Art

An example of a prior art steering control system of this kind is disclosed in Japanese Provisional Patent Publication No. 61-115776. In the prior art steering control system, a desired vehicle behavior or motion characteristic (e.g., a desired response-to-yaw rate characteristic) is set as a reference model so that a rear wheel steering angle capable of attaining a yaw rate determined by the reference model is calculated based on the vehicle dynamics.

The prior art steering control system is provided with a plurality of references models which are selected by a switching or changeover operation so that a plurality of driving modes are available.

However, since a plurality of driving modes are selectively and readily available by a simple switching operation, there arises the problem that if the selected driving mode is changed from one to another during running of the vehicle the steering angle of the rear wheels is changed abruptly, causing an abrupt vehicle behavior that is not only uncomfortable but is undesirable from a safe driving point of view.

In order to solve the above problem, it is necessary to construct the system so that the above switching or changeover can be effected only when the rear wheel steering angle is zero or nearly zero. However, even with this structure, the above described problem cannot be solved completely and to a satisfactory extent.

SUMMARY OF THE INVENTION

In accordance with the present invention, there is provided a method of controlling the secondary steering of a wheeled vehicle. The method comprises determing at least one state variable relating to a yawing or lateral motion of the vehicle on the basis of a running condition of the vehicle, performing a secondary steering in response to the state variable, changing a secondary steering relationship including a control routine or a control constant for thereby changing a driving mode of the vehicle, judging that the state variable is equal to or larger than a predetermined value and producing a signal representative of the same, and preventing change of the secondary steering control routine or control constant in response to the aforementioned signal for thereby preventing a change in the driving mode of the vehicle.

In accordance with the present invention, there is also provided a steering control system for a wheeled vehicle. The steering control system comprises a control unit for determining at least one state variable relating to a yawing or lateral motion of the vehicle on the basis of a running condition of the vehicle, secondary steering driving means for driving the wheels to perform secondary steering in response to the state variable determined by the control unit, the control unit being capable of selectively changing a secondary steering control routine or control constant for thereby changing a driving mode of the vehicle, state variable judging means for judging that the state variable is equal to or larger than a predetermined value and producing a signal representative of same, and driving mode change preventing means for preventing change of the secondary steering control routine or control constant in response to the signal from the state variable judging means.

The above method and system are effective for solving the above noted problem inherent in the prior art device.

It is accordingly an object of the present invention to provide a novel steering control system for a wheeled vehicle which does not cause abrupt behavior of the vehicle even when a driving mode selection switch is manually operated to change the driving mode during running of the vehicle.

It is another object of the present invention to provide a novel steering control system of the above described character which is adapted to prevent change of the driving mode when the rear wheels or wheels for secondary steering are deviated from their neutral positions, i.e., the straight-ahead positions, by an amount equal to or larger than a predetermined amount.

It is a further object of the present invention to provide a novel steering control system of the above described character which is desirable from a safe driving point of view.

It is a further object of the present invention to provide a novel method of controlling secondary steering of a wheeled vehicle which is of the above described character.

DESCRIPTION OF THE PREFERRED EMBODIMENTS

Figure 1:
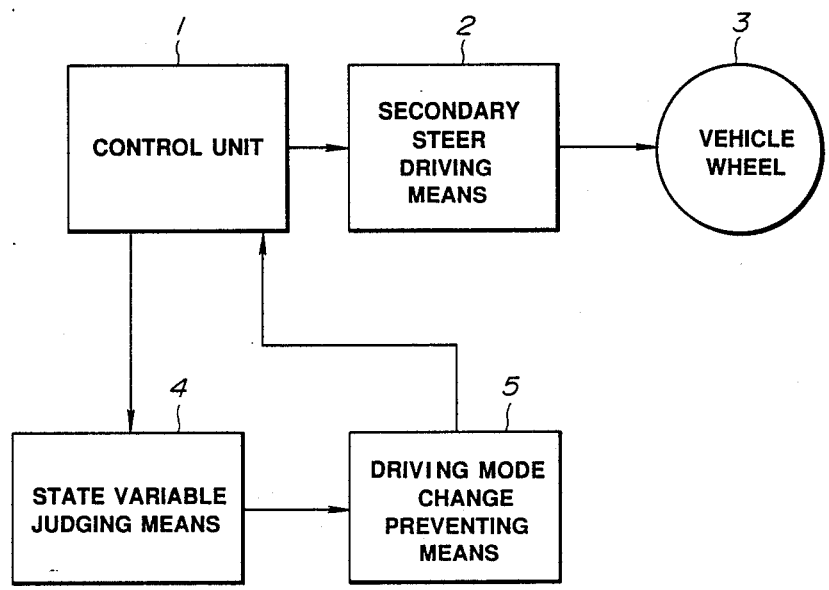
FIG. 1 is a block diagram of a steering control system according to an embodiment of the present invention.
Figure 2:
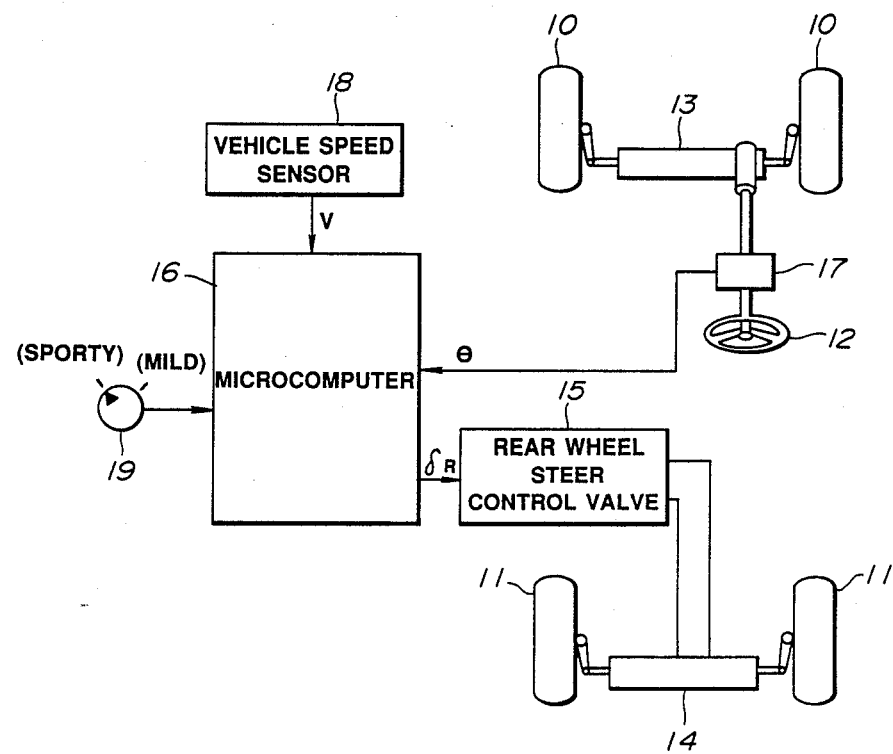
FIG. 2 is a schematic view of a steering control system according to another embodiment of the present invetion.

Referring first to FIG. 1, a steering control system of the present invention is shown as including a control unit 3 for calculating at least one state variable relating to a yawing or lateral motion of a vehicle on the basis on a vehicle running condition, a secondary steering driving unit 2 for driving a set of steerable wheels 3 to perform secondary steering in response to the above described state variable so that a driving mode is changeable by changing the secondary steering control routine or control variable, a state variable judging means 4 for judging whether the state variable is larger than a predetermined value and a driving mode change preventing means 5 for preventing change of the secondary steer control routine or control variable in response to a signal from the state variable judging means.

In operation, the control unit 1 determines a state variable relating to a yawing or lateral motion of a vehicle on the basis of a vehicle running condition. The secondary steering driving unit 2 drives the wheels 3 so that the steering angle of the wheels 3 corresponds to the state variable, whereby to attain a desired steering characteristic or vehicle running characteristic.

The state variable judging means 4 judges whether the aforementioned stated variable is equal to or larger than a predetermined value. If the state variable is smaller than a predetermined value, the driving mode change preventing means 5 permits change of the aforementioned secondary steering control routine or control constant. In this instance, if there is automatically or manually caused a comand for the change, the command is excuted to change the driving mode.

On the other hand, when the state variable is equal to or larger than a predetermined value, the driving mode change preventing means 5 pevents change of the aforementioned secondary steering control routine or control constant. Due to this even if there is a comand for change of the driving mode, the driving mode is maintained unchanged. By the way, with a prior art steering control system, an abrupt vehicle behavior may occur when the state variable is equal to or larger than a predetermined value. The steering control system of this invention can prevent such an abrupt vehicle behavior since it is adapted to prevent change of the driving mode when the state variable is equal to or larger than a predetermined value.

Referring to FIGS. 2 to 5, a steering control system according to another embodiment of the present invention is shown as being applied to a vehicle having a set of steerable front wheels 10, a set of steerable rear wheels 11, a steering wheel 12 and a steering gear 13. By a steering effort applied to the steering wheel 12, the steering gear 13 is actuated to turn the front wheels 10 in the conventional manner, whereby to effect main steering of the vehicle.

For control of the steering or running characteristic of the vehicle, the rear wheels 11 are adapted to be hydraulically steered by the operation of an actuator 14 which is controlled by a rear wheel steering control valve 15. The control valve 15 is electronically controlled by a command signal representing a calculated rear wheel angle $\delta_R$ and supplied thereto from a control unit 16 which may be a microcomputer such that the actuator 14 is actuated to steer the rear wheels 11 by an angle $\delta R$.

The microcomputer (control unit) 16 receives a signal representing a rotation angle, i.e., a steering angle $\theta$ from a steering angle sensor 17, a signal representing a vehicle speed V from a vehicle speed sensor 18 and a sporty driving mode selecting signal or a mild driving mode selecting signal from a driving mode selection switch 19 which is manually operated by a driver for selecting a driving mode on the basis of a vehicle running condition and a driver's taste.

Figure 3:
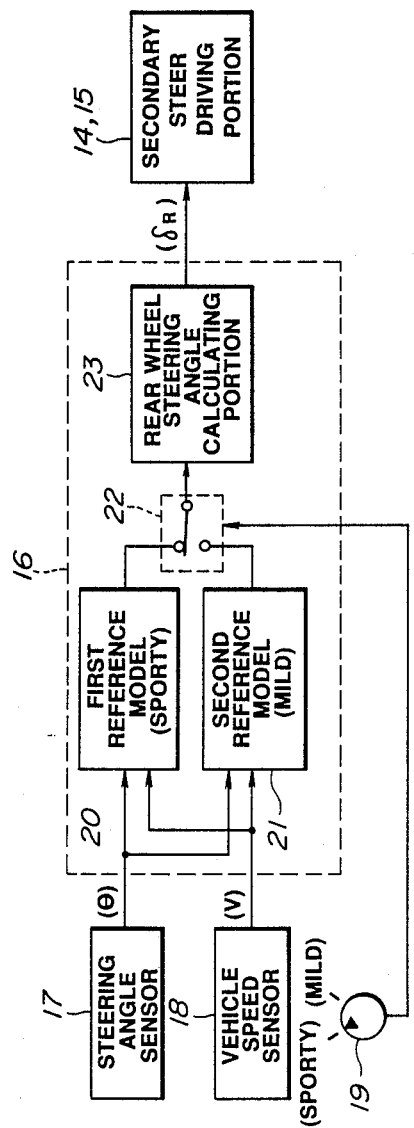
FIG. 3 is a block diagram of the rear wheel steering angle calculating portion of a microcomputer employed in the steering control system of FIG. 2.

The control unit 16 has such operations that are shown by the block diagram in FIG. 3, i.e., the control unit 16 includes first and second reference models 20 and 21 corresponding to the sporty driving mode and mild driving mode which are selected by the mode selection switch 19, a switching portion 22 and a rear wheel steering angle calculating portion 23. A target yawing motion corresponding to the steering wheel angle $\theta$ and the vehicle speed V which are detected by the sensors 17 and 18 are determined by the reference models 20 and 21 as follows.

(I) In case of the first reference model 20, assuming that $\theta$ is a steering angle, $K_1(V)$ is a control constant, $\tau_1$ is a time constant and S is a laplacean, a target yaw rate $\dot{\phi}$ is calculated by using the following expression. In this connection, however, $\tau_1$ is for example set to be 0.005 sec. and $K_1(V)$ is set to be such as shown in FIG. 4.

$$\frac{\dot{\phi}}{\theta} = \frac{k_1(v)}{1 + \tau_1 \cdot s}$$

Figure 4:
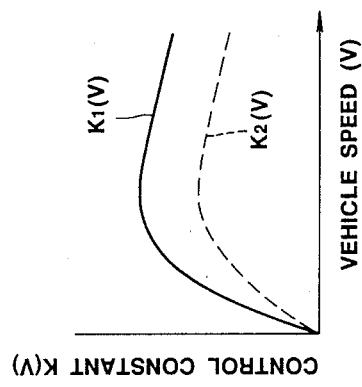
FIG. 4 is a graph depicting the variation characteristics of control constants for respective driving modes.

(II) In case of the second reference model 21, assuming that the time constat $\tau_2$ is for example set to be 0.1 sec. and the control constant $K_2(V)$ is set to be such as shown in FIG. 4, the target yaw rate $\dot{\phi}$ is determined by the following expression.

$$\frac{\dot{\phi}}{\theta} = \frac{k_2(v)}{1 + \tau_2 \cdot s}$$

The driving mode changing portion 22 selectively receives from the reference model 20 or 21 a target yaw rate $\dot{\phi}$ and supplies it to the rear wheel steering angle calculating portion 23. The rear wheel steering angle calcualting portion 23 calculates, at each operation cycle $\Delta t$, a target rear wheel steering angle $\delta_R$ for attaining the target yaw rate $\dot{\phi}$ by using the following expression.

$$V_y = \int_0^t \dot{V}_y \cdot dt (V_y = V_y + \Delta t \cdot \dot{V}_y) \quad (1)$$

$$C_F = ek_F\{\theta/N - (V_y + L_F \cdot \ddot{\phi})/V\} \quad (2)$$

$$C_R = (2L_F C_F - I_z \cdot \ddot{\phi})/2L_R \quad (3)$$

$$\dot{V}_y = (2C_F + 2C_R)/M - V \cdot \dot{\phi} \quad (4)$$

$$\delta_R = C_R/K_R + (V_y - L_R \cdot \dot{\phi})/V \quad (5)$$

where
$V_y$=the lateral acceleration of the vehicle wheels (estimated value).
$C_F$=the cornering force of the front wheel (estimated value)
$C_R$=the cornering force of the rear wheel (estimated value),
$eK_F$=the equivalent cornering power of the front wheel.
$K_R$=the equivalent cornering power of the rear wheel,
$L_F$=the distance between the centers of gravity of the front wheel axes,
$L_R$=the distance between the centers of gravity of the rear wheel axes,
M=the mass of the vehicle,
$I_Z$=the yaw inertia of the vehicle,
N =the steering gear ratio.

The thus calculated result $\delta_R$ is supplied to the secondary steer driving portion consisting of the control valve 15 and the actuator 14 (specifically, supplied to the control valve 15), whereby by the operation of the control valve 15 the actuator 14 is caused to stroke a corresponding distance and in a corresponding direction, thus causing the rear wheels 11 to turn by $\delta_R$ for thereby attaining the target yaw rate $\dot{\phi}$.

Figure 5:
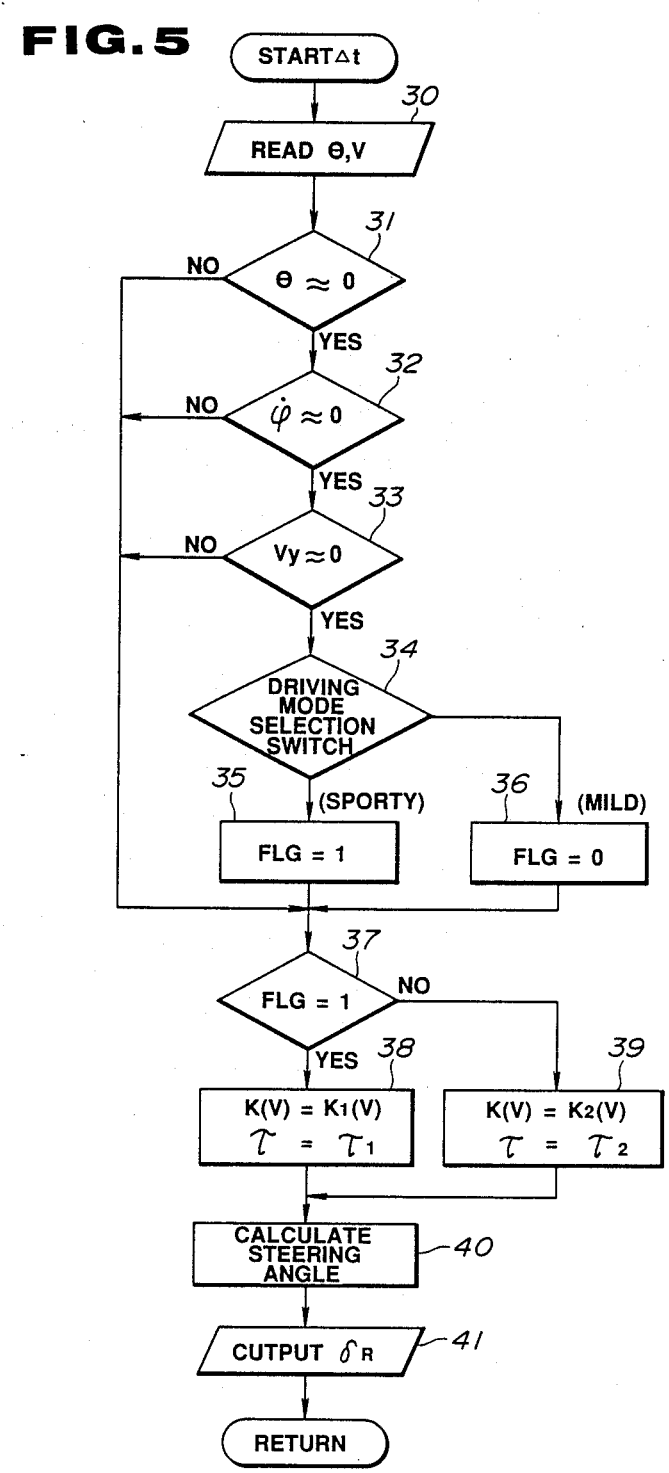
FIG. 5 is a flow chart depicting a program for the microcomputer employed in the steering control system of FIG. 2.

The above described calculation for obtaining is performed by making the computer 16 execute the control program shown in FIG. 5. The control program is executed by time interruption at each operation cycle Δt. Firstly, at step 30, the steering angle θ and the vehicle speed V are read and stored. At steps 31, 32 and 33, it is judged whether the steering angle θ, the target yaw rate $\dot{\phi}$ that is determined in the above described manner and the estimated lateral acceleration $V_y$ are smaller than respective predetermined values for thereby judging whether they are nearly zero.

In this instance, the foregoing expressions (1) to (5) can be rewritten by the state matrix into the following expressions.

$$\frac{d}{dt} = \begin{bmatrix} \dot{\phi} \\ V_y \end{bmatrix} = \begin{bmatrix} -1/\tau & 0 \\ a_{21} & a_{22} \end{bmatrix} \begin{bmatrix} \dot{\phi} \\ V_y \end{bmatrix} + \begin{bmatrix} k(V)/\tau \\ b_2 \end{bmatrix} \theta \quad (6)$$

$$\delta_R = [C_1 \ C_2] \begin{bmatrix} \dot{\phi} \\ V_y \end{bmatrix} + d\theta \quad (7)$$

From the expression (7), it will be understood that the judgement whether θ, $\dot{\phi}$ and $V_y$ are nearly zero is equivalent to the judgement whether the calculated rear wheel steering angle is nearly zero. From the expression (6), it will be apparent that $\dot{\phi}$ and $V_y$ do not change abruptly since they are the outputs of the control unit 16, i.e., the state variables. Accordingly, the state of all of θ, $\dot{\phi}$ and $V_y$ being zero means that the vehice is in a straight-ahead running condition, during which change of the driving mode by the operation of the selection switch 19 does not cause an abrupt change of the calculated rear wheel steering angle $\delta_R$.

For this reason, only when it is judged at steps 31 to 33 that $\theta \approx 0$, $\dot{\phi} \approx 0$ and $V_y \approx 0$, is the program routine advanced to step 34. At step 34, it is judged which one of the sporty driving mode and mild driving mode is selected. When the sporty driving mode is selected, the mode flag FLG is set to store "1" at step 35. When the mild driving mode is selected, the mode flag FLG is set to store "0" at step 36. At step 37, it is judged whether the mode flag FLG is set to store "1" or "0". When the mode flag FLG is set to store "1", the control constant K(V) and the time constant τ are respectively set to $K_1(V)$ and $\tau_1$ for the sporty driving mode. When the mode flag FLG is set to store "0", the control constant K(V) and the time constant τ are set to $K_2(V)$ and $\tau_2$ for the mild driving mode. At step 40, the target yaw rate $\dot{\phi}$ is determined in the above described manner based on the control constant and the time constant, and a target rear wheel steering angle $\delta_R$ for obtaining the thus determined target yaw rate $\dot{\phi}$ is calculated. Thereafter, at ste 41, the calculated rear wheel steering angle $\delta_R$ is supplied to rear wheel steer control valve 15, thus causing the rear wheels 11 to turn by $\delta_R$ and thereby attaining the target yaw rate $\dot{\phi}$.

In the rear wheel steer control, the switching operation of the mode selection switch 19 for selection of one of the driving modes is judged at step 34, and corresponding switching operations are peformed at steps 35 and 36, thus making it possible to attain a desired steering control according to the selected driving mode. However, since the vehicle is now in such a state that $\theta \approx 0$, $\dot{\phi} \approx 0$ and $V_y \approx 0$, an abrupt change of the calculated rear wheel steering angle $\delta_R$ does not occur even when a switching operation for changing the above described driving mode is performed, thus making it possible to prevent an abrupt behavior of the vehicle.

On the other hand, when it is judged at steps 31 to 33 that the steering angle θ, the target yaw rate $\dot{\phi}$ and the estimated lateral acceleration $V_y$ are equal to or larger than respective predetermined values, the control routine is advanced to the step 37 by bypassing the steps 34 to 36. Thus, even when the driver operates the selection switch 19 to change the driving mode, the steps 35 and 36 are not excuted, so that the mode flag FLG is not changed. Accordingly, the actually selected driving mode is maintained unchaged even when the mode selecting operation of the switch 19 is performed, thus making it possible to prevent an abrupt behavior of the vehicle in reponse to the switching operation.

While the present invention has been described and shown, it is not limitative. For example, while the selection of the mode has been described and shown as being performed by the manual operation of the switch 19, the above described $eK_F$ and $K_R$ may be automatically changed based on the road surface friction, the vehicle acceleration and deceleration, etc. so as to adjust the vehicle dynamics to a desired one.

What is claimed is:

1. A method of controlling secondary steering of a wheeled vehicle, comprising:
    determining at least one state variable relating to a yawing or lateral motion of said vehicle on the basis of a running condition of said vehicle;
    performing secondary steering in response to said state variable;
    changing a secondary steering control relationship for changing a driving mode of said vehicle;
    judging that said state variable is equal to or larger than a predetermined value and producing a signal representative of same; and
    preventing change of said secondary steering control relationship in response to said signal for preventing change of said driving mode of said vehicle.

2. A method as set forth in claim 1 wherein said judging comprises the steps of:
    detecting a vehicle speed and a steering angle for main steering of said vehicle;
    determining a target jaw rate and an estimated lateral acceleration based on said steering angle and said vehicle speed; and
    judging whether said steering angle, said target yaw rate and said estimated lateral acceleration are equal to or larger than respective predetermined values.

3. A steering control system for a wheeled vehicle having a set of steerable wheels for secondary steering of the vehicle, comprising:
    a control unit for determining at least one state variable relating to a yawing or lateral motion of said vehicle on the basis of a running condition of said vehicle;
    secondary steering driving means for driving said wheels to perform secondary steering in response to said state variable determined by said control unit;
    said control unit selectively changing a secondary steering control relationship for changing a driving mode of said vehicle;
    state variable judging means for judging that said state variable is equal to or larger than a predetermined value and producing a signal representative of said state variable; and driving mode change preventing means for preventing change of said secondary steering control relationship in response to said signal from said state variable judging means.

4. A steering control system for a wheeled vehicle having a set of steerable front wheels and a set of steerable rear wheels, comprising:
   a steering gear for steering said front wheels;
   a steering angle sensor for detecting a steering angle of said front wheels;
   a hydraulic rear wheel actuator for steering said rear wheels;
   a rear wheel steering control valve for controlling a supply of hydraulic pressure to said actuator for controlling operation of said actuator; and
   a control unit for controlling operation of said control valve and operative to selectively change a rear wheel steering control relationship for changing a driving mode of said vehicle on the basis of a steering angle detected by said steering angle sensor and a vehicle speed;
   said control unit having means for determining at least one state variable relating to a yawing or lateral motion of said vehicle, state variable judging means for judging that said state variable is equal to or larger than a predetermined value and producing a signal representative of said state variable, and driving mode change preventing means for preventing changing of said rear wheel steering control relationship in response to said signal from said state variable judging means.

5. A steering control system as set forth in claim 4 wherein said control unit further comprises a first reference model operative to determine a first state variable, a second reference model operative to determine a second state variable different from said first state variable, means for selecting one of said reference models, and means for determining steering of said rear wheels on the basis of said state variable of a selected one of said first and second reference models.

* * * * *